United States Patent
Chen et al.

(10) Patent No.: US 9,960,691 B2
(45) Date of Patent: May 1, 2018

(54) CONTROL CIRCUIT, CONTROL METHOD AND FLYBACK CONVERTER OF PRIMARY-SIDE FEEDBACK CONTROL THEREOF

(71) Applicant: Silergy Semiconductor Technology (Hangzhou) Ltd., Hangzhou (CN)

(72) Inventors: Huiqiang Chen, Hangzhou (CN); Jianxin Wang, Hangzhou (CN)

(73) Assignee: SILERGY SEMICONDUCTOR TECHNOLOGY (HANGZHOU) LTD., Hangzhou (CN)

(*) Notice: Subject to any disclaimer, the term of this patent is extended or adjusted under 35 U.S.C. 154(b) by 0 days. days.

(21) Appl. No.: 15/099,876

(22) Filed: Apr. 15, 2016

(65) Prior Publication Data
US 2016/0308447 A1 Oct. 20, 2016

(30) Foreign Application Priority Data

Apr. 16, 2015 (CN) .......................... 2015 1 0180544

(51) Int. Cl.
*H02M 3/335* (2006.01)
*H02M 1/42* (2007.01)
*H02M 1/00* (2006.01)

(52) U.S. Cl.
CPC ..... *H02M 3/33523* (2013.01); *H02M 1/4258* (2013.01); *H02M 2001/0022* (2013.01); *H02M 2001/0064* (2013.01); *Y02B 70/126* (2013.01)

(58) Field of Classification Search
CPC ..... H02M 3/33507; H02M 2001/0032; H02M 3/33523; H02M 2001/0009; H02M 3/158; H02M 3/33515; H02M 1/4208; H02M 2001/0022; H02M 2001/0064; Y02B 70/16; Y02B 70/1433
See application file for complete search history.

(56) References Cited

U.S. PATENT DOCUMENTS

| 2010/0033992 A1* | 2/2010 | Fukui ................ H02M 3/33507 363/16 |
| 2011/0012530 A1* | 1/2011 | Zheng ................ H05B 33/0815 315/294 |
| 2015/0280578 A1* | 10/2015 | Huang ................ H02M 1/32 363/21.12 |

FOREIGN PATENT DOCUMENTS

| CN | 103715898 A | 4/2014 |
| CN | 103887984 A | 6/2014 |

* cited by examiner

*Primary Examiner* — Henry Lee, III
(74) *Attorney, Agent, or Firm* — Westman, Champlin & Koehler, P.A.

(57) ABSTRACT

The disclosure relates to a control circuit, a control method and a flyback converter of primary-side feedback control including the control circuit. On the basis of the current sampling signal feedback, the flyback converter of primary-side feedback control is controlled to operate in a constant on time mode when the input voltage is large, and is controlled to operate in a peak current mode when the input voltage is close to a valley. Thus, the peak value of the primary-side current may not become too small because of a decreased input voltage, further avoiding occurrence of an error sampling after a blanking time due to excessive variations in demagnetization time.

12 Claims, 6 Drawing Sheets

CONTROL CIRCUIT, CONTROL METHOD AND FLYBACK CONVERTER OF PRIMARY-SIDE FEEDBACK CONTROL THEREOF

CLAIM OF PRIORITY

This application claims priority to Chinese Application No. 201510180544.5, filed on Apr. 16, 2015, which is hereby incorporated by reference.

BACKGROUND OF THE DISCLOSURE

Field of the Disclosure

The disclosure relates to the field of power electronics, and more particularly, to a control circuit, a control method and a flyback converter of primary-side feedback control including the control circuit.

Description of the Related Art

A conventional switching converter is controlled to operate in a constant on time mode for a higher power factor. Because the proportional coefficient between a input current and a input voltage is in proportion to the ratio of the square power of the on time period to the switching cycle, the input current may largely follow the input voltage if the on time period is fixed and the switching cycle doesn't change much during the whole power frequency period. As a result, a higher power factor (PFC) is achieved. Thus, a converter controlled in a constant on time mode is often used in the power factor adjustment circuits.

For the flyback converter of primary-side feedback control, a blanking time is typically set to avoid sampling in a time period during which a voltage across the auxiliary winding oscillates, because the feedback voltage together with the secondary-side current zero-crossing signal or a valley detection signal are sampled based on a voltage across the auxiliary winding.

However, due to the existence of periodic or random fluctuations in an input voltage, a current peak of a current flowing through the primary-side power switch becomes very low if it is still controlled in a constant on time mode, when the input voltage is close to a valley. This leads to a decrease of the peak value of the secondary-side current and further a shortened demagnetization time at the secondary side. Shortening the demagnetization time further results in an error voltage, which is obtained by sampling after the blanking time, and high deviation in the output voltage. FIG. 1a is an operational waveform diagram when the input voltage is at a peak, and FIG. 1b is an operational waveform diagram when the input voltage is at a valley. FIG. 1a and FIG. 1b both show the waveforms of the current detection signal and the voltage detection signal. It is clear that the voltage sampling signal obtained by sampling after the blanking time, is valid when the input voltage is at a peak, and the voltage detection signal obtained by sampling after the blanking time, decreases significantly, which cannot correctly represent the information about the output voltage or the secondary-side current when the input voltage is close to a valley.

BRIEF DESCRIPTION OF THE DISCLOSURE

In view of this, there is provided a control circuit, a control method and a flyback converter of primary-side feedback control including the control circuit. They are used to solve the problems that the flyback converter of primary-side feedback control cannot correctly sample a voltage across an auxiliary winding so that the output voltage detection, zero-crossing detection and valley-value detection cannot be performed when the input voltage is at a valley.

According to a first aspect, there is provided a control circuit for controlling a power stage circuit in a flyback converter of primary-side feedback control, comprising:

a current sampling circuit configured to sample a primary-side current and to obtain a current sampling signal;

a voltage sampling circuit configured to sample a voltage across an auxiliary winding after a blanking time and to obtain a voltage sampling signal; and a control signal generating circuit configured to generate a switching control signal in accordance with the voltage sampling signal and the current sampling signal, in which the switching control signal is generated in a constant on time mode when the current sampling signal is larger than a current threshold at a constant on time point, and is generated in a peak current mode when the current sampling signal is smaller than the current threshold at the constant on time point;

wherein the switching control signal controls a power switch in the power stage circuit, and the constant on time point is a time point at which the switching control signal maintains to be valid for a predetermined constant on time period.

Preferably, the control signal generating circuit comprises:

a set signal generating circuit configured to provide a set signal in accordance with the voltage sampling signal when a secondary-side current crosses zero or a voltage sampling signal is located at a valley;

a reset signal generating circuit configured to provide a reset signal when the switching control signal maintains to be valid for the predetermined constant on time period and the current sampling signal rises to reach the current threshold; and a logic circuit configured to set the switching control signal to be valid in accordance with the set signal, and to set the switching control signal to be invalid in accordance with the reset signal.

Preferably, the reset signal generating circuit comprises:

a timing circuit configured to generate a timing signal which indicates that the switching control signal maintains to be valid for the predetermined constant on time period;

a comparator configured to compare the current sampling signal with the current threshold and to provide a comparison result; and a reset logic circuit configured to generate the reset signal in accordance with the timing signal and the comparison result.

Preferably, the blanking time varies with a peak value of the current sampling signal.

Preferably, the voltage sampling circuit comprises:

a blanking circuit configured to provide a blanking signal representing a first time when the peak value of the current sampling signal is smaller than a first value, and provide a blanking signal representing a second time when the peak value of the current sampling signal is larger than a second value, and provide a blanking signal representing a third time when the peak value of the current sampling signal is smaller than the second value and larger than the first value, wherein the third time is a function of the peak value; and a sampling circuit configured to sample a voltage in accordance with the blanking signal.

Preferably, the blanking circuit comprises:

a blanking threshold generating circuit configured to provide a corresponding blanking threshold in accordance with a relationship between the peak of the current sampling signal and the first value and the second value; and a blanking timing circuit configured to provide the blanking signal representing the corresponding blanking time in accordance with the blanking threshold.

According to a second aspect, there is provided a control circuit for controlling a power stage circuit in a flyback converter of primary-side feedback control, comprising:

a current sampling circuit configured to sample a primary-side current and to obtain a current sampling signal;

a voltage sampling circuit configured to sample a voltage across an auxiliary winding after a blanking time and to obtain a voltage sampling signal, in which the blanking time varies with a peak value of the current sampling signal; and a control signal generating circuit configured to generate a switching control signal having a constant on time period in accordance with the voltage sampling signal;

wherein the switching control signal controls a power switch in the power stage circuit.

Preferably, the voltage sampling circuit comprises:

a blanking circuit configured to provide a blanking signal representing a first time when the peak value of the current sampling signal is smaller than a first value, and provide a blanking signal representing a second time when the peak value of the current sampling signal is larger than a second value, and provide a blanking signal representing a third time when the peak value of the current sampling signal is smaller than the second value and larger than the first value, wherein the third time is a function of the peak value; and a sampling circuit configured to sample a voltage in accordance with the blanking signal.

Preferably, the blanking circuit comprises:

a blanking threshold generating circuit configured to provide a corresponding blanking threshold in accordance with a relationship between the peak value of the current sampling signal and the first value and the second value; and a blanking timing circuit configured to provide the blanking signal representing the corresponding blanking time in accordance with the blanking threshold.

According to a third aspect, there is provided a flyback converter of primary-side feedback control, comprising:

a power stage circuit; and an control circuit as mentioned above.

According to a fourth aspect, there is provided a control method for controlling a flyback converter of primary-side feedback control, comprising:

sampling a primary-side current to obtain a current sampling signal, and sampling a voltage across an auxiliary winding after a blanking time to obtain a voltage sampling signal;

controlling a power switch in the flyback converter of primary-side feedback control in accordance with the voltage sampling signal and the current sampling signal, wherein the power switch is controlled in a constant on time mode when the current sampling signal is larger than a current threshold at a constant on time point, and is controlled in a peak current mode when the current sampling signal is smaller than the current threshold at the constant on time point; and the constant on time point is a time point at which the switching control signal maintains to be valid for a predetermined constant on time period.

Preferably, the step of controlling a power switch in the flyback converter of primary-side feedback control in accordance with the voltage sampling signal and the current sampling signal comprises:

controlling the power switch to be turned on in accordance with the voltage sampling signal when a secondary-side current crosses zero or a voltage sampling signal is located at a valley; and controlling the power switch to be turned off when the switching control signal maintains to be valid for the predetermined constant on time period and the current sampling signal rises to reach the current threshold.

Preferably, the blanking time varies with a peak of the current sampling signal.

On the basis of the current sampling signal feedback, the flyback converter of primary-side feedback control is controlled to operate in a constant on time mode when the input voltage is large, and is controlled to operate in a peak current mode when the input voltage is close to a valley. Thus, the peak value of the primary-side current may not become too small because of a decreased input voltage, further avoiding occurrence of an error sampling after a blanking time due to excessive variations in demagnetization time.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF EMBODIMENTS OF THE DISCLOSURE

Reference will now be made in detail to particular embodiments of the disclosure, it will be understood that the scope of the present invention is not limited to these embodiments. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1A:
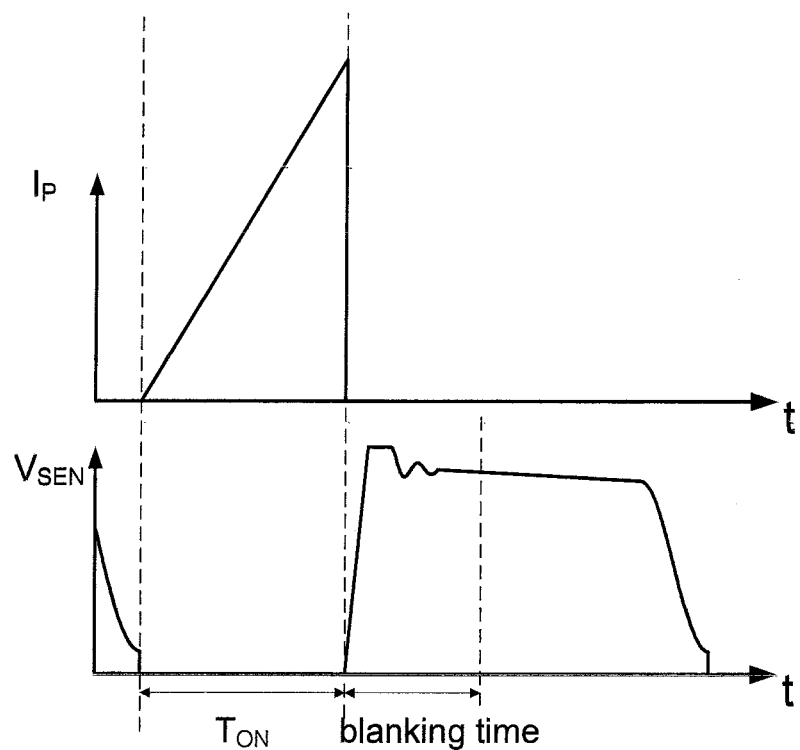
FIG. 1a is an operational waveform diagram of an example flyback converter when the input voltage is at a peak value.
Figure 1B:
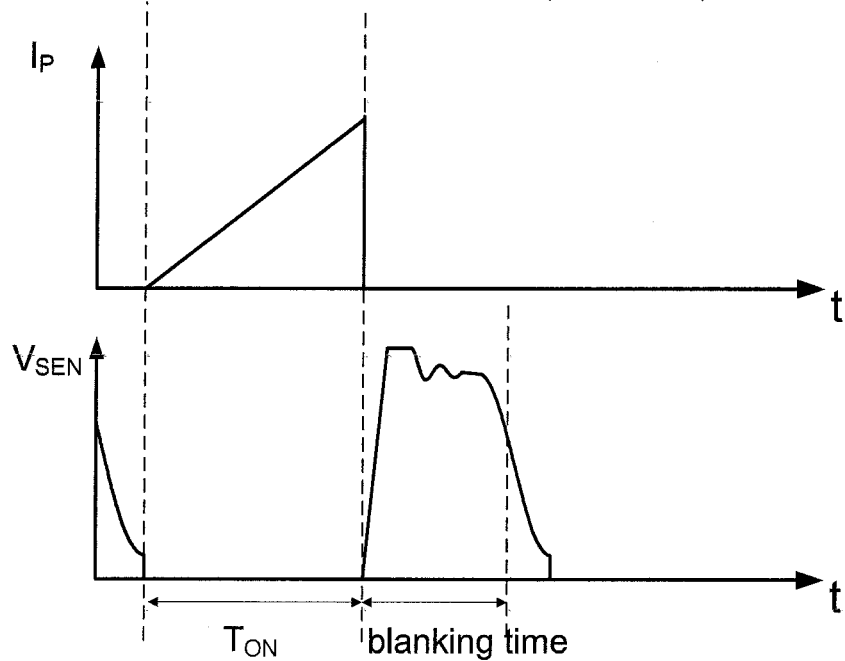
FIG. 1b is an operational waveform diagram of an example flyback converter when the input voltage is at a valley value.
Figure 2:
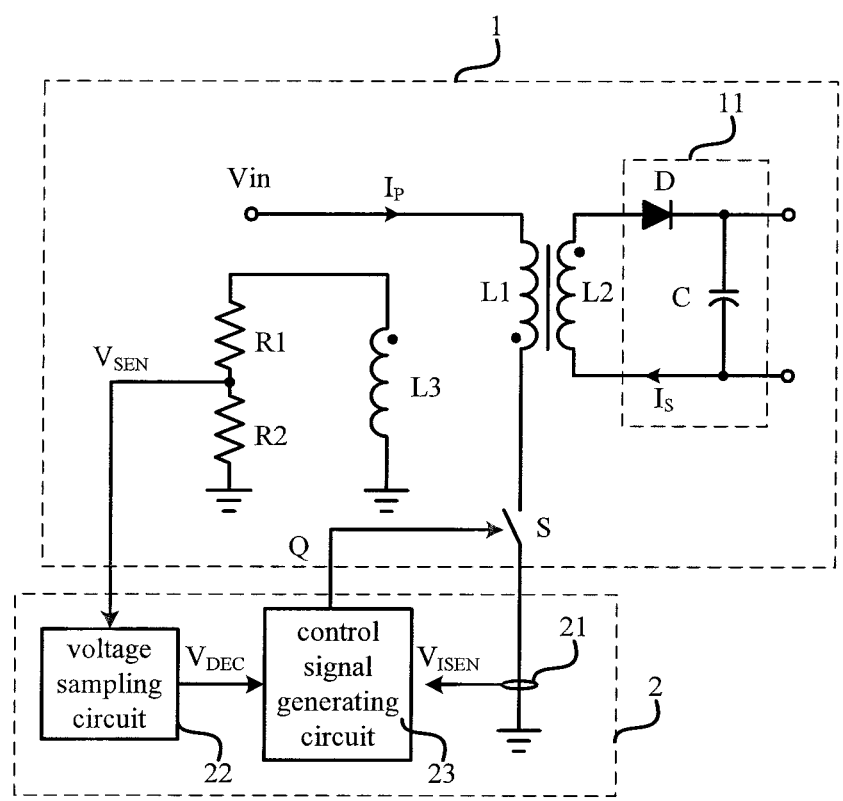
FIG. 2 is a schematic circuit diagram of an example flyback converter of primary-side feedback control according to an embodiment of the present disclosure.

FIG. 2 is a schematic circuit diagram of an example flyback converter of primary-side feedback control according to an embodiment of the present disclosure. As shown in FIG. 2, the flyback converter of primary-side feedback control includes a power stage circuit 1 and a control circuit 2. The power stage circuit 1 having a flyback topology structure, includes a primary winding L1 and a power switch S being coupled in series between the voltage input terminal $V_{in}$, and the ground, a secondary winding L2 being coupled to the primary winding L1 and a secondary rectifier circuit 11 coupled to the secondary winding L2. The power stage circuit 1 further includes an auxiliary winding L3 and division resistors R1 and R2 for dividing the voltage across the auxiliary winding. The auxiliary winding L3 is coupled to the primary winding L1. The voltage across the auxiliary winding L3 is used to obtain the output voltage information of the power stage circuit 1, the time point of current crossing zero of the secondary winding L2 and the time point of the valley current of the secondary winding L2. Accordingly, the above information can be obtained by sampling across the auxiliary winding L3 after the voltage division, and the power switch S can be controlled according to the information.

The voltage across the auxiliary winding L3 oscillates after the power switch S is turned off. The oscillation leads to voltage fluctuations and further leads to an error voltage sampling. The voltage obtained by the error voltage sampling is not relevant to the output voltage of the power stage circuit 1, and thus, an error may occur with controlling the power switch. A blanking time is necessary to be set for avoiding an error voltage sampling. The voltage sampling is not performed when the auxiliary winding L3 oscillates. The blanking time is set to be a fixed value in the prior art. However, because demagnetization time is shortened when the input voltage is close to a valley, the voltage across the auxiliary winding decreases significantly after the predetermined blanking time so that the time points of the secondary-side current crossing zero or the secondary side valley current cannot be detected correctly. Thus, the control circuit 2 according to an embodiment of the disclosure is required to solve the above problems.

The control circuit 2 includes a current sampling circuit 21, a voltage sampling circuit 22 and a control signal generating circuit 23.

The current sampling circuit 21 samples a primary-side current $I_P$ and obtains a current sampling signal $V_{ISEN}$. The current sampling signal $V_{ISEN}$ representing the primary-side current $I_P$, is a voltage signal. It should be understood that the current signal is also used as the current sampling signal.

The voltage sampling circuit 22 samples a voltage $V_{SEN}$ across an auxiliary winding after a blanking time and obtains a voltage sampling signal $V_{DEC}$. The voltage sampling signal $V_{DEC}$ represents the operational states of the voltage across the auxiliary winding after the blanking time.

The control signal generating circuit 23 generates a switching control signal Q in accordance with the voltage sampling signal $V_{DEC}$ and the current sampling signal $V_{ISEN}$. The switching control signal Q controls the power switch S to be turned on or off. The control signal generating circuit 23 generates the switching control signal Q in a constant on time mode when the current sampling signal $V_{ISEN}$ is larger than a current threshold $V_{ISEN\_MIN}$ at a constant on time point, at which the switching control signal maintains to be valid for a constant on time period $T_{ON}$ or at which the current sampling signal $V_{ISEN}$ increases continuously for the predetermined constant on time period $T_{ON}$ from the bottom. The control signal generating circuit 23 generates the switching control signal Q in a peak current mode when the current sampling signal $V_{ISEN}$ is smaller than the current threshold $V_{ISEN\_MIN}$ at the constant on time point.

The constant on time period $T_{ON}$ is the on time period when the switching control signal Q is generated in the constant on time mode.

Figure 3:
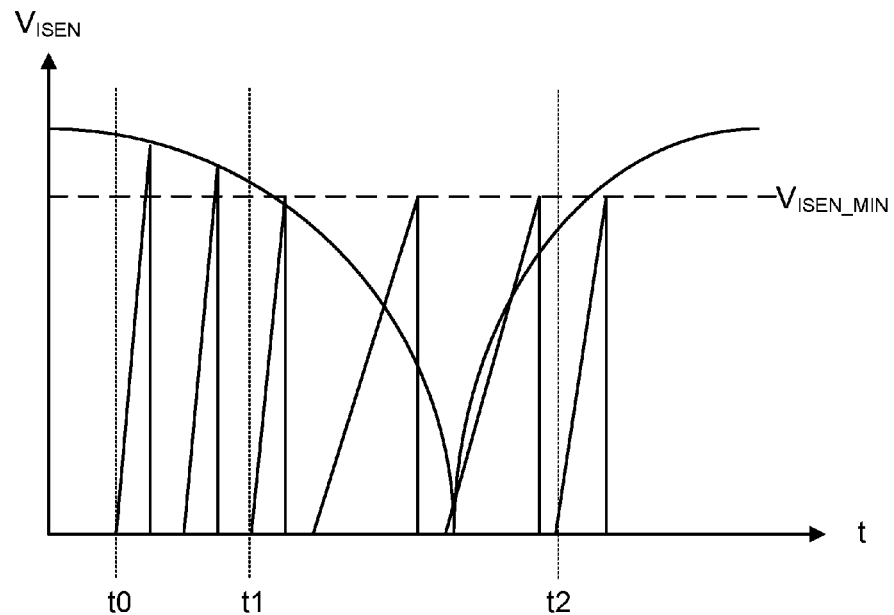
FIG. 3 is an operational waveform diagrams of a control circuit according to an embodiment of the present disclosure.

FIG. 3 is operational waveform diagrams of a control circuit according to an embodiment of the present disclosure. As shown in FIG. 3, an input voltage $V_{in}$ decreases periodically or randomly, which makes the slope of the primary-side current $I_P$, i.e. an input current, and its peak values decrease. During the time period t0-t1, the primary-side current $I_P$ is larger than the current threshold $V_{ISEN\_MIN}$ at the constant on time point after the primary-side current rises for the predetermined constant on time period $T_{ON}$, that is, the primary-side current $I_P$ increases continuously after the power switch S is turned on. This means the current input voltage isn't too small. Then the switching control signal Q is set to be invalid, the power switch S is turned off, and the primary-side current $I_P$ turns to zero until the power switch S is turned on again. During the time period t1-t2, the primary-side current $I_P$ is smaller than the current threshold $V_{ISEN\_MIN}$ at the constant on time point after it rises for the predetermined constant on time period $T_{ON}$. This means the current input voltage is too small and a small peak value of the primary-side current $I_P$ leads to a shortened demagnetization time and an error sampling. Thus, the system switches to the current peak mode, in which the power switch S isn't turned off and the primary-side current $I_P$ continues rising, and in which the power switch S is turned off when the primary-side current $I_P$ reaches to the current threshold $V_{ISEN\_MIN}$, which makes the primary-side current $I_P$ turn to zero. As a result, it is guaranteed that the peak values of the primary-side current $I_P$ will never be smaller than the current threshold $V_{ISEN\_MIN}$ in any cases, and the demagnetization time of the secondary-side current $I_S$ will never be smaller than a minimum value. Because the demagnetization time is guaranteed to have the minimum value, the blanking time is set to ensure that a voltage is sampled in accordance with the blanking time if the demagnetization time is equal to the minimum value, which will not lead to an error sampling. Thus, the error sampling after the blanking time will be avoided, which occurs due to large variations in the demagnetization time. After the time point t2, the system switches back to the constant on time mode due to an increase of the input voltage.

Figure 4:
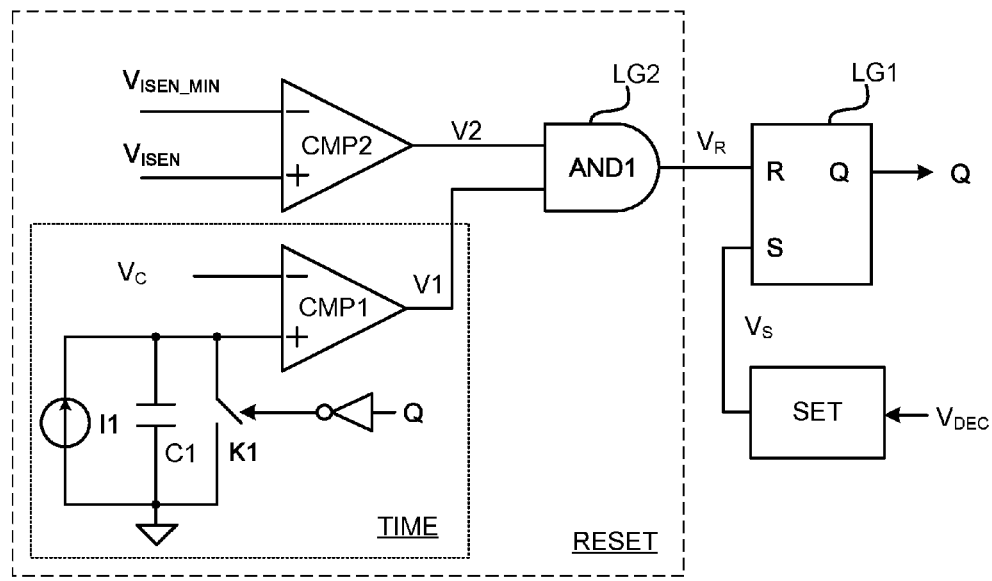
FIG. 4 is a schematic circuit diagram of an control signal generating circuit according to an embodiment of the present disclosure.

FIG. 4 is a schematic circuit diagram of a control signal generating circuit according to an embodiment of the present disclosure. As shown in FIG. 4, the control signal generating circuit 23 includes a set signal generating circuit SET, a reset signal generating circuit RESET and a logic circuit LG1.

The set signal generating circuit SET detects the time point at which the secondary-side current crosses zero or the voltage across the auxiliary winding is at a valley, in accordance with the voltage sampling signal $V_{DEC}$, and provides a set signal $V_S$ when the secondary-side current $I_S$ crosses zero or the voltage sampling signal $V_{DEC}$ is at a valley. The set signal $V_S$ may be a voltage pulse, a rising edge or a falling edge of a voltage.

The reset signal generating circuit RESET provides a reset signal $V_R$ when the switching control signal Q maintains to be valid for the predetermined constant on time period $T_{ON}$ and the current sampling signal $V_{ISEN}$ rises to the current threshold $V_{ISEN\_MIN}$. The reset signal $V_R$ may be a voltage pulse, a falling edge or rising edge of a voltage.

The reset signal generating circuit RESET controls the system to switch between the constant on time mode and the peak current mode. It is necessary for the reset signal generating circuit RESET to complete the following actions. It detects the current sampling signal $V_{ISEN}$ for determining whether it is larger than the current threshold $V_{ISEN\_MIN}$ when the power switch S has been an on state for the predetermined constant on time period $T_{ON}$. If the current sampling signal $V_{ISEN}$ is larger than the current threshold $V_{ISEN\_MIN}$, the reset signal generating circuit RESET immediately provides a reset signal $V_R$ for turning off the power switch S (i.e. a constant on time mode), and if the current sampling signal $V_{ISEN}$ is smaller than the current threshold $V_{ISEN\_MIN}$, it waits until the current sampling signal $V_{ISEN}$ rises to have a peak value equal to the current threshold $V_{ISEN\_MIN}$ and then provides a reset signal $V_R$ for turning off the power switch S (i.e. a current peak mode). From the above, it is known that providing the reset signal $V_R$ requires two conditions, one is that the power switch S maintains to be an on state for a time period larger than or equal to the constant on time period $T_{ON}$, the other is that the current sampling signal $V_{ISEN}$ rises to a value larger than the current threshold $V_{ISEN\_MIN}$. Thus, the reset signal generating circuit RESET is set to output the reset signal $V_R$ in a case that the two conditions are both satisfied. The detail scheme can use the circuit shown in FIG. 4. However, it is easily understood that the skilled in the prior art can design another specific circuit in other ways in accordance with the above configuration. As shown in FIG. 4, the reset signal generating circuit RESET includes a timing circuit TIME, a comparator CMP1, and a reset logic circuit LG2.

The timing circuit TIME generates a timing signal V1 which indicates that the switching control signal Q maintains to be valid for the predetermined constant on time period $T_{ON}$, that is, the constant on time point in the current cycle comes.

Specifically, the timing circuit TIME includes a comparator CMP2, a current source I1, a charging capacitor C1 and a switch K1. The current source I1, charging capacitor C1 and switch K1 are coupled in parallel between the non-inverting input terminal of the comparator CMP2 and the ground. The comparator CMP2 receives a constant voltage Vc at the inverting input terminal. The switch K1 are controlled to be turned on and off in accordance with the inverting signal of the switching control signal, that is, the switch K1 is turned off while the power switch S is turned on and turned on while the power switch S is turned off. The current source I1 charges the charging capacitor C1 to increase the voltage at the non-inverting terminal with a determined slop after the switch K1 is turned off. The capacitor C1 discharges as a short circuit to decrease the voltage at the non-inverting terminal to zero in a short time after the switch K1 is turned on. After the power switch S is turned on, the voltage of the non-inverting terminal rises for a constant on time $T_{ON}$ and reaches the constant voltage Vc. Under the condition, the timing signal V1 from the comparator CMP2 hops, so that the hop of the timing signal V1 can indicate the switching control signal Q maintains to be valid for the predetermined constant on time period $T_{ON}$.

The comparator CMP1 compares the current sampling signal $V_{ISEN}$ with the current threshold $V_{ISEN\_MIN}$ and provides a comparison result V2.

The timing circuit TIME provides the timing signal V1 which indicates if the switching control signal Q maintains to be valid for the predetermined constant on time period $T_{ON}$, and the comparator CMP1 provides the comparison result V2 which indicates if the current sampling signal $V_{ISEN}$ rises to the current threshold $V_{ISEN\_MIN}$.

The reset logic circuit LG2 generates a reset signal VR in accordance with the timing signal V1 and the comparison result V2. In the embodiment, the timing signal V1 has a high level which indicates that the switching control signal Q maintains to be valid for the predetermined constant on time period $T_{ON}$, and the comparison result V2 also has a high level which indicates that the current sampling signal $V_{ISEN}$ rises to the current threshold $V_{ISEN\_MIN}$. Thus, the reset logic circuit LG2 can use an and logic gate AND1 which receives the timing signal V1 and the comparison result V2, and provides a hopped reset signal VR at the time point when the signals are both high level. Then the control signal generating circuit 23 sets the switching control signal Q to be invalid.

The logic circuit LG1 sets the switching control signal Q to be valid in accordance with the set signal $V_S$ and sets the switching control signal Q to be invalid in accordance with the reset signal $V_R$. In the embodiment, that the switching control signal is set to be valid means that the switching control signal is set to a level for turning on the power switch, and that the switching control signal is set to be invalid means that the switching control signal is set to a level for turning off the power switch. In the embodiment, the logic circuit LG1 is based on a RS flip-flop.

On the basis of the current sampling signal feedback, the flyback converter of primary-side feedback control is controlled to operate in a constant on time mode when the input voltage is large, and is controlled to operate in a peak current mode when the input voltage is close to a valley. Thus, the peak value of the primary-side current may not become too low because of the decreased input voltage, further avoiding occurrence of an error sampling after a blanking time due to excessive variations in demagnetization time.

Further, the blanking time is set to change with the current sampling signal $V_{ISEN}$ for better preventing an error sampling due to a fixed blanking time. Based on the circuit principles, that the voltage of the current sampling signal $V_{ISEN}$ is larger indicates that the leakage inductance energy is higher and the demagnetization time should be longer. That means the leakage inductance and parasitic capacitance oscillates more seriously after the power switch is turned off. Thus, an operational mode in which the blanking time varies with the current sampling signal $V_{ISEN}$, should be adopted.

Figure 5:
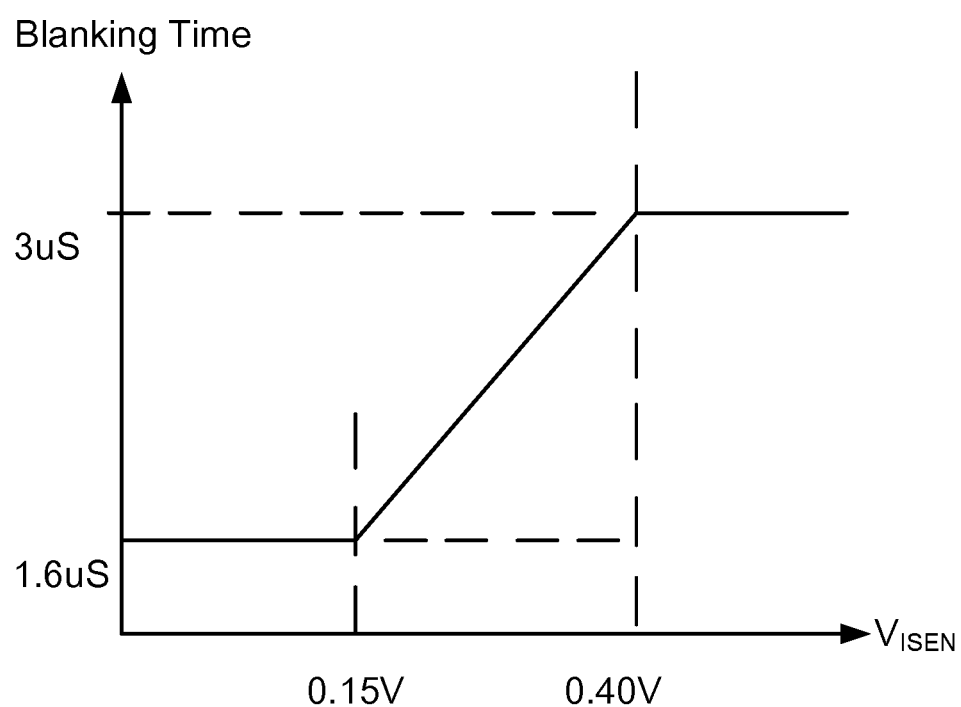
FIG. 5 is a curve diagram showing a variation of a blanking time with a current sampling signal according to an embodiment of the present disclosure.

FIG. 5 is a curve diagram showing a variation of a blanking time with a current sampling signal according to an embodiment of the present disclosure. As shown in FIG. 5, when the blanking operation is performed, the switching control signal has been set to be invalid and the peak value of primary-side current in the current cycle can be obtained. Thus, the blanking time can be controlled by the peak value of the current sampling signal $V_{ISEN}$. When the current sampling signal $V_{ISEN}$ has a peak value smaller than the first value (for example, 0.15V in FIG. 5), the blanking time is set to be a predetermined first time (for example, 1.6 μs in FIG. 5). When the current sampling signal $V_{ISEN}$ has a peak value larger than a second value (for example, 0.4V in FIG. 5), the blanking time is set to be a predetermined second time (for example, 3 μs in FIG. 5). When the current sampling signal $V_{ISEN}$ has a peak value smaller than the second value and larger than the first value, the blanking time is set to be a third time varying with the peak value of the current sampling signal, and the third time is a function of the peak value of the current sampling signal $V_{ISEN}$ in the current switching cycle. In FIG. 5, the third time is a linear function of the peak value.

Correspondingly, the voltage sampling circuit 22 includes a blanking circuit BT and a sampling circuit SP on the basis of the above schemes.

The blanking circuit BT provides a blanking signal $V_B$ representing the first time when the peak value $V_{PEAK}$ of the current sampling signal $V_{ISEN}$ is smaller than a first value $V_{S1}$, and provide the blanking signal $V_B$ representing the second time when the peak value $V_{PEAK}$ of the current sampling signal $V_{ISEN}$ is larger than a second value $V_{S2}$, and provide a blanking signal $V_B$ representing the third time when the peak value $V_{PEAK}$ of the current sampling signal $V_{ISEN}$ is smaller than the second value $V_{S2}$ and larger than the first value $V_{S1}$, wherein the third time is a function of the peak value.

The sampling circuit SP samples a voltage in accordance with the blanking signal $V_B$.

Specifically, the blanking circuit BT may include a blanking threshold generating circuit BT1 and a blanking timing circuit BT2.

The blanking threshold generating circuit BT1 provides a corresponding blanking threshold $V_{TH}$ in accordance with a relationship between the peak value of the current sampling signal $V_{ISEN}$ and a combination of the first value $V_{S1}$ and the second value $V_{S2}$. For example, in the embodiment, the blanking threshold generating circuit BT1 provides a predetermined first voltage as the blanking threshold $V_{TH}$ when the peak value of the current sampling signal $V_{ISEN}$ is smaller than the first value $V_{S1}$, and provides a predetermined second voltage as the blanking threshold $V_{TH}$ when the peak value of the current sampling signal $V_{ISEN}$ is larger than the second value $V_{S2}$, and provides a variable varying linearly with the current sampling signal $V_{ISEN}$ when the peak value of the current sampling signal $V_{ISEN}$ is larger than the first value $V_{S1}$ and smaller than the second value $V_{S2}$.

Figure 6:
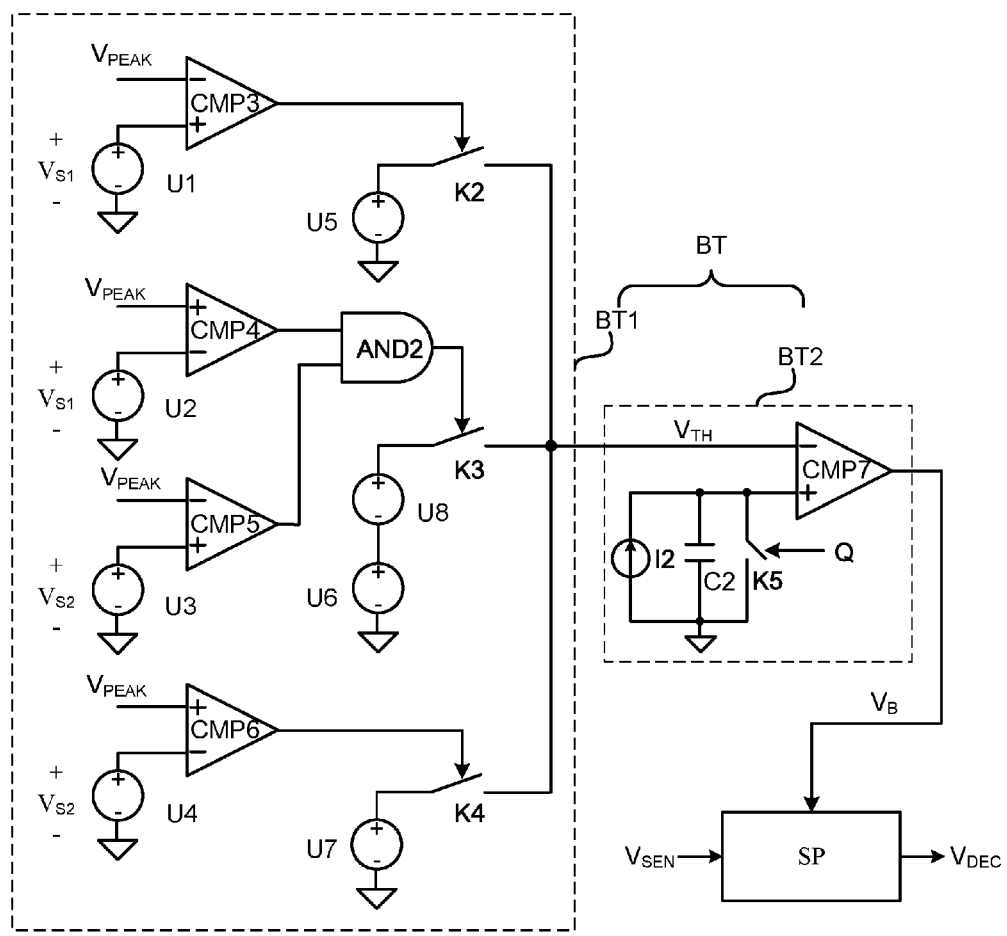
FIG. 6 is a schematic circuit diagram of an example voltage sampling circuit according to an embodiment of the disclosure.

Specifically, as shown in FIG. 6, the blanking threshold generating circuit BT1 includes comparators CMP3 to CMP6, voltage sources U1 to U7, switches K2 to K4, a voltage control voltage source U8 and an and logic gate AND2.

The voltage source U1 being coupled between the non-inverting input terminal of the comparator CMP3 and the ground provides a voltage equal to the first value $V_{S1}$ to the non-inverting input terminal. The comparator CMP3 receives the current sampling signal $V_{ISEN}$ with a peak value $V_{PEAK}$ at the inverting input terminal. Thus, the comparator outputs a high level when the current sampling signal $V_{ISEN}$ has the peak value $V_{PEAK}$ smaller than the first value $V_{S1}$. The comparator CMP3 has an output terminal being coupled to a control terminal of the switch K2. The switch K2 is turned on when the comparator CMP3 outputs a high level. The switch K2 has one terminal being coupled to the voltage source U5 and another terminal being coupled to the output terminal of the blanking threshold generating circuit BT1. The blanking threshold generating circuit BT1 receives a first voltage from the voltage source U5 as the blanking threshold at the output terminal after the switch K2 is turned on.

The voltage source U2 being coupled between the inverting input terminal of the comparator CMP4 and the ground provides a voltage equal to the first value $V_{S1}$ to the inverting input terminal. The comparator CMP4 receives a current sampling signal $V_{ISEN}$ with a peak value $V_{PEAK}$ at the inverting input terminal. The voltage source U3 being coupled between the non-inverting input terminal of the comparator CMP5 and the ground provides a voltage equal to the second value $V_{S2}$ to the non-inverting input terminal. The comparator CMP5 receives a current sampling signal $V_{ISEN}$ with a peak value $V_{PEAK}$ at the inverting input terminal. The comparators CMP4 and CMP5 have the output terminals being coupled to the input terminal of the and gate AND2. Thus, the and gate AND2 outputs a high level when the current sampling signal $V_{ISEN}$ has the peak value $V_{PEAK}$ larger than the first value $V_{S1}$ and smaller than the second value $V_{S2}$. The and gate AND2 has an output terminal being coupled to the control terminal of the switch K3. The switch K3 is turned on when the and gate AND2 outputs a high level. The switch k3 has one terminal being coupled to the series circuit formed by the voltage source U6 and the voltage control voltage source U8, and another terminal being coupled to the output terminal of the blanking threshold generating circuit BT1. After the switch K3 is turned on, the blanking threshold generating circuit BT1 receives a voltage varying linearly with the peak value $V_{PEAK}$ of the current sampling signal $V_{ISEN}$ at the output terminal. The voltage is generated by the series circuit including the voltage source U6 and the voltage control voltage source U8. It is understood that in the above circuits, the connections between the input terminals and the inverting input terminals can be changed or reversed, or the logic gate is replaced with any of other types of logic gates, in order to have the same functions.

The voltage source U4 being coupled between the inverting input terminal of the comparator CMP6 and the ground provides a voltage equal to the second value $V_{S2}$ to the inverting input terminal. The comparator CMP6 receives the current sampling signal $V_{ISEN}$ with a peak value $V_{PEAK}$ at the non-inverting input terminal. Thus, the comparator CMP6 outputs a high level when the current sampling signal $V_{ISEN}$ has the peak value $V_{PEAK}$ larger than the second value $V_{S2}$. The comparator CMP6 has an output terminal being coupled to a control terminal of the switch K4. The switch K4 is turned on when the comparator CMP6 outputs a high level. The switch K4 has one terminal being coupled to the voltage source U7 and another terminal being coupled to the output terminal of the blanking threshold generating circuit BT1. The blanking threshold generating circuit BT1 receives a second voltage from the voltage source U7 at the output terminal when the switch K4 is turned on.

One switch of the switches K2 to K4 is turned on and the other two are turned off in the above blanking threshold generating circuit BT1. Thus, the blanking threshold generating circuit BT1 provides the blanking threshold having a relationship with the peak value $V_{PEAK}$ of the current sampling signal $V_{ISEN}$ as the curve in FIG. 5.

The blanking timing circuit BT2 provides the blanking signal $V_B$ representing the corresponding blanking time in accordance with the blanking threshold $V_{TH}$.

Specifically, the blanking timing circuit BT2 includes a comparator CMP7, a current source I2, a charging capacitor C2 and a switch K5. The current source I2, charging capacitor C2 and switch K5 are coupled in parallel between the non-inverting input terminal of the comparator CMP7 and the ground. The comparator CMP2 receives a time threshold $V_{TH}$ at the inverting input terminal. The switch K5 are controlled to be turned on and off in accordance with the switching control signal Q, that is, the switch K5 is turned off while the power switch S is turned off and turned on while the power switch S is turned on. The current source I2 charges the charging capacitor C2 to increase the voltage at the non-inverting terminal with a determined slop after the switch K5 is turned off. The capacitor C2 discharges as a short circuit to decrease the voltage at the non-inverting terminal to zero in a short time after the switch K5 is turned on. After the power switch S is turned off, the voltage of the non-inverting terminal rises to the blanking threshold $V_{TH}$ for a time period corresponding to the time threshold $V_{TH}$. In the case, the timing signal $V_B$ from the comparator CMP7 hops, so that the hop of the blanking signal $V_B$ can represent the blanking time varying with the blanking threshold $V_{TH}$.

Thus, the time point for sampling a voltage changes with the variation in the voltage oscillation of the auxiliary winding by setting a blanking time varying with the current sampling signal $V_{ISEN}$, and it further improves the performance for avoiding an error occurrence in voltage sampling.

It is necessary to be pointed out that the voltage sampling circuit in FIG. 6 may be applied to the control circuit which is only controlled in the constant on time mode. That is, the control circuit includes a current sampling circuit, the above voltage sampling circuit, and the above control signal generating circuit in which the switching control signal is generated in the constant on time mode. Because the blanking time varies with the current sampling signal $V_{ISEN}$, the control signal generating circuit can be controlled to operate in the constant on time mode for avoiding an error voltage sampling.

Figure 7:
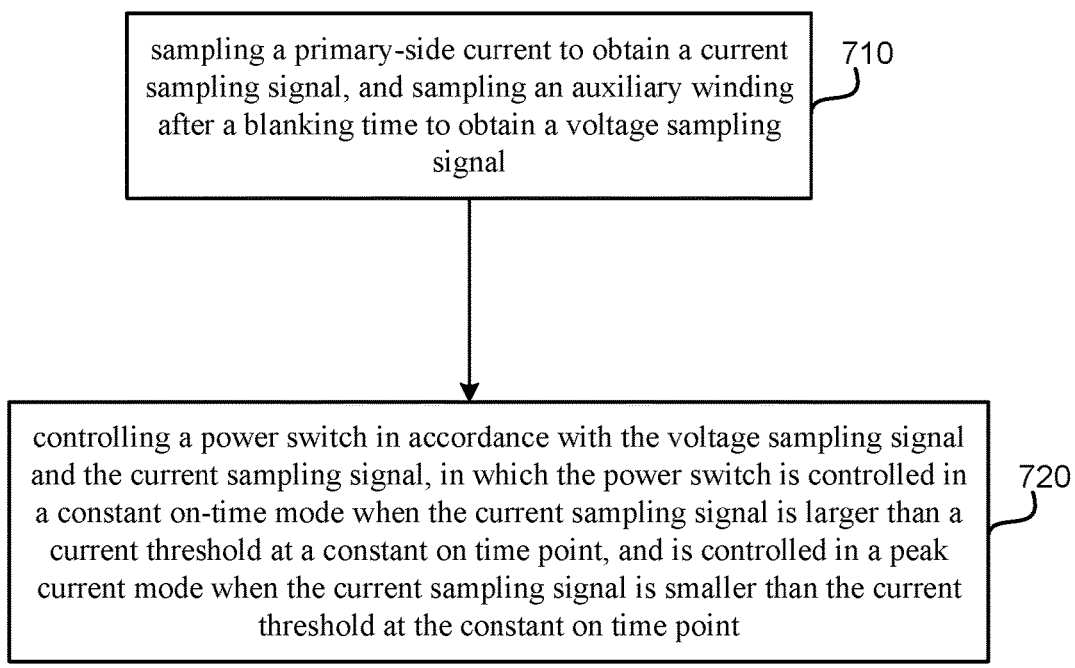
FIG. 7 is a flow chart of an example control method according to an embodiment of the present disclosure.

FIG. 7 is a flow chart of an example control method according to an embodiment of the present disclosure. As shown in FIG. 7, the method comprises the following steps.

At step 710, a primary-side current is sampled and a current sampling signal is obtained, and a voltage is sampled across an auxiliary winding after a blanking time and a voltage sampling signal is obtained.

At step 720, a power switch in the flyback converter of primary-side feedback control is controlled in accordance with the voltage sampling signal and the current sampling signal, in which the power switch is controlled in a constant on time mode when the current sampling signal is larger than a current threshold at a constant on time point, and is controlled in a peak current mode when the current sampling signal is smaller than the current threshold at the constant on time point.

The constant on time point is a time point at which the switching control signal maintains to be valid for a predetermined constant on time period.

Preferably, the step 720 in which a power switch in the flyback converter of primary-side feedback control is controlled in accordance with the voltage sampling signal and the current sampling signal comprises the following steps.

At step 721, the power switch is controlled to be turned on in accordance with the voltage sampling signal when a secondary-side current crosses zero or a voltage sampling signal is at a valley.

At step 722, the power switch is controlled to be turned off when the switching control signal maintains to be valid for the predetermined constant on time period and the current sampling signal increases to the current threshold.

On the basis of the current sampling signal feedback, the flyback converter of primary-side feedback control is controlled to operate in a constant on time mode when the input voltage is large, and is controlled to operate in a peak current mode when the input voltage is close to a valley. Thus, the peak value of the primary-side current may not become too low because of the decreased input voltage, further avoiding occurrence of an error sampling after a blanking time due to excessive variations in demagnetization time.

Preferably, the blanking time varies with the peak value of the current sampling signal.

Thus, the time point at which to sample a voltage is controlled to change with the variation in the voltage oscillation of the auxiliary winding by setting a blanking time varying with the current sampling signal $V_{ISEN}$, and it further improves the performance for avoiding an error voltage sampling.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

What is claimed is:

1. A control circuit for controlling a power stage circuit in a flyback converter of primary-side feedback control, comprising:
 a current sampling circuit configured to sample a primary-side current and to obtain a current sampling signal;
 a voltage sampling circuit configured to sample a voltage across an auxiliary winding after a blanking time and to obtain a voltage sampling signal; and
 a control signal generating circuit configured to generate a switching control signal in accordance with said voltage sampling signal and said current sampling signal, in which said switching control signal is generated in a constant on time mode when said current sampling signal is larger than a current threshold at a constant on time point, and is generated in a peak current mode when said current sampling signal is smaller than said current threshold at said constant on time point,
 wherein said switching control signal controls a power switch in said power stage circuit, and said constant on time point is a time point at which said switching control signal maintains to be valid for a predetermined constant on time period.

2. The control circuit according to claim 1, wherein said control signal generating circuit comprises:

a set signal generating circuit configured to provide a set signal in accordance with said voltage sampling signal when a secondary-side current crosses zero or a voltage sampling signal is located at a valley;

a reset signal generating circuit configured to provide a reset signal when said switching control signal maintains to be valid for said predetermined constant on time period and said current sampling signal rises to reach said current threshold; and a logic circuit configured to set said switching control signal to be valid in accordance with said set signal, and to set said switching control signal to be invalid in accordance with said reset signal.

3. The control circuit according to claim 2, wherein said reset signal generating circuit comprises:

a timing circuit configured to generate a timing signal which indicates that said switching control signal maintains to be valid for said predetermined constant on time period;

a comparator configured to compare said current sampling signal with said current threshold and to provide a comparison result; and a reset logic circuit configured to generate said reset signal in accordance with said timing signal and said comparison result.

4. The control circuit according to claim 1, wherein said blanking time varies with a peak value of said current sampling signal.

5. The control circuit according to claim 4, wherein said voltage sampling circuit comprises:

a blanking circuit configured to provide a blanking signal representing a first time when said peak value of said current sampling signal is smaller than a first value, and provide a blanking signal representing a second time when said peak value of said current sampling signal is larger than a second value, and provide a blanking signal representing a third time when said peak value of said current sampling signal is smaller than said second value and larger than said first value, wherein said third time is a function of said peak value; and a sampling circuit configured to sample a voltage in accordance with said blanking signal.

6. The control circuit according to claim 5, wherein said blanking circuit comprises:

a blanking threshold generating circuit configured to provide a corresponding blanking threshold in accordance with a relationship between said peak of said current sampling signal and said first value and said second value; and a blanking timing circuit configured to provide said blanking signal representing said corresponding blanking time in accordance with said blanking threshold.

7. A control circuit for controlling a power stage circuit in a flyback converter of primary-side feedback control, comprising:

a current sampling circuit configured to sample a primary-side current and to obtain a current sampling signal;

a voltage sampling circuit configured to sample a voltage across an auxiliary winding after a blanking time and to obtain a voltage sampling signal, in which said blanking time varies with a peak value of said current sampling signal; and a control signal generating circuit configured to generate a switching control signal having a constant on time period in accordance with said voltage sampling signal;

wherein said switching control signal controls a power switch in said power stage circuit, and said voltage sampling circuit comprises:

a blanking circuit configured to provide a blanking signal representing a first time when said peak value of said current sampling signal is smaller than a first value, and provide a blanking signal representing a second time when said peak value of said current sampling signal is larger than a second value, and provide a blanking signal representing a third time when said peak value of said current sampling signal is smaller than said second value and larger than said first value, wherein said third time is a function of said peak value; and a sampling circuit configured to sample a voltage in accordance with said blanking signal.

8. The control circuit according to claim 7, wherein said blanking circuit comprises:

a blanking threshold generating circuit configured to provide a corresponding blanking threshold in accordance with a relationship between said peak value of said current sampling signal and said first value and said second value; and a blanking timing circuit configured to provide said blanking signal representing said corresponding blanking time in accordance with said blanking threshold.

9. A flyback converter of primary-side feedback control, comprising:

a power stage circuit; and a control circuit according to claim 1.

10. A control method for controlling a flyback converter of primary-side feedback control, comprising:

sampling a primary-side current to obtain a current sampling signal, and sampling a voltage across an auxiliary winding after a blanking time to obtain a voltage sampling signal;

controlling a power switch in said flyback converter of primary-side feedback control in accordance with said voltage sampling signal and said current sampling signal, wherein said power switch is controlled in a constant on time mode when said current sampling signal is larger than a current threshold at a constant on time point, and is controlled in a peak current mode when said current sampling signal is smaller than said current threshold at said constant on time point; and said constant on time point is a time point at which said switching control signal maintains to be valid for a predetermined constant on time period.

11. The control method according to claim 10, wherein said step of controlling a power switch in said flyback converter of primary-side feedback control in accordance with said voltage sampling signal and said current sampling signal comprises:

controlling said power switch to be turned on in accordance with said voltage sampling signal when a secondary-side current crosses zero or a voltage sampling signal is located at a valley; and controlling said power switch to be turned off when said switching control signal maintains to be valid for said predetermined constant on time period and said current sampling signal rises to reach said current threshold.

12. The control method according to claim 10, wherein said blanking time varies with a peak of said current sampling signal.

* * * * *